United States Patent
Li et al.

(10) Patent No.: US 11,363,102 B2
(45) Date of Patent: Jun. 14, 2022

(54) COMMUNICATION METHOD AND APPARATUS FOR NETWORK ACCESSIBLE ONLY IN SPECIFIC AREA

(71) Applicant: HUAWEI TECHNOLOGIES CO.,LTD., Guangdong (CN)

(72) Inventors: Yongcui Li, Beijing (CN); Yan Li, Beijing (CN); Tingfang Tang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/886,599

(22) Filed: May 28, 2020

(65) Prior Publication Data
US 2020/0296170 A1     Sep. 17, 2020

Related U.S. Application Data

(63) Continuation of application No. PCT/CN2018/111627, filed on Oct. 24, 2018.

(30) Foreign Application Priority Data

Nov. 30, 2017  (CN) .................. 201711240792.X
Jan. 8, 2018   (CN) .................. 201810015632.3

(51) Int. Cl.
*H04L 29/08*     (2006.01)
*H04L 67/141*    (2022.01)
(Continued)

(52) U.S. Cl.
CPC ........... *H04L 67/141* (2013.01); *H04W 48/16* (2013.01); *H04W 88/02* (2013.01)

(58) Field of Classification Search
CPC ..... H04W 48/18; H04W 76/11; H04W 76/12; H04W 4/50; H04W 28/0268;
(Continued)

(56) References Cited

U.S. PATENT DOCUMENTS

2008/0285492 A1* 11/2008 Vesterinen ............ H04W 8/082
                                                     370/310
2009/0270064 A1* 10/2009 Kunniyur ............ H04L 65/1069
                                                     455/404.1
(Continued)

FOREIGN PATENT DOCUMENTS

CN    103096343 A    5/2013
CN    105657790 A    6/2016
(Continued)

OTHER PUBLICATIONS

U.S. Appl. No. 62/477,255 (Priority Application for PG Publication of Faccin et al. (US 2018/0279397 A1), filed on Mar. 27, 2017 (Year: 2017).*

(Continued)

*Primary Examiner* — Daniel Lai
(74) *Attorney, Agent, or Firm* — Paul Christopher Hashim

(57) ABSTRACT

This application provides a communication method and an apparatus. The method includes: a terminal determines that a detected application is associated with a first network; determines, based on information configured on the terminal, that the first network is a network accessible only in a specific area; obtains network information for the first network; and in response to when the terminal is within an area indicated by the network information, determine to initiate a session management procedure.

18 Claims, 7 Drawing Sheets

---

1101. A terminal obtains policy information, where the policy information includes a local indication and a network identifier used to identifies a first network, and the local indication indicates that the first network is a network accessible only in a specific area 1102. The terminal determines, based on the policy information, that the first network associated with a detected application is a network accessible only in a specific area

(51) Int. Cl.
  *H04W 48/16* (2009.01)
  *H04W 88/02* (2009.01)

(58) Field of Classification Search
  CPC ..... H04W 48/16; H04W 24/02; H04W 76/10;
    H04W 8/183; H04W 72/0493; H04W
    24/04; H04W 48/08; H04W 48/17; H04W
    48/20; H04W 4/02; H04W 4/029; H04W
    64/003; H04W 88/14; H04W 16/02;
    H04W 48/00; H04W 48/02; H04W 48/04;
    H04W 4/021; H04W 4/025; H04W
    72/048; H04W 76/22; H04W 80/02;
    H04W 88/085; H04W 88/16; H04W
    28/0257; H04W 28/0263; H04W 40/12;
    H04W 40/24; H04W 40/246; H04W
    40/248; H04W 48/10; H04W 48/14;
    H04W 4/00; H04W 4/023; H04W 4/33;
    H04W 60/06; H04W 72/0406; H04W
    76/30; H04W 76/34; H04W 88/02; H04L
    8/06; H04W 8/205; H04W 8/02; H04L
    65/1069; H04L 67/14; H04L 1/0001;
    H04L 41/08; H04L 41/20; H04L 41/5003;
    H04L 47/20; H04L 47/24; H04L 47/2408;
    H04L 47/2475; H04L 47/627; H04L
    5/0085; H04L 67/141
  See application file for complete search history.

(56) References Cited

U.S. PATENT DOCUMENTS

| | | | |
|---|---|---|---|
| 2015/0163702 A1 | 6/2015 | Wu et al. | |
| 2018/0279397 A1* | 9/2018 | Faccin | H04W 8/18 |
| 2018/0367953 A1* | 12/2018 | Shimizu | H04W 8/12 |
| 2019/0095858 A1* | 3/2019 | Unnerstall | G06Q 10/0833 |
| 2019/0141618 A1* | 5/2019 | Yin | H04W 48/16 |
| 2020/0120751 A1* | 4/2020 | Sugawara | H04W 48/16 |

FOREIGN PATENT DOCUMENTS

| | | |
|---|---|---|
| CN | 103348713 B | 8/2017 |
| CN | 107087255 A | 8/2017 |
| JP | 2016526807 A | 9/2016 |
| JP | 2017092901 A | 5/2017 |
| JP | 2017519438 A | 7/2017 |
| KR | 20150043638 A | 4/2015 |
| RU | 2619920 C2 | 5/2017 |

OTHER PUBLICATIONS

3GPP TS 23.501 V1.3.0 (Sep. 2017);3rd Generation Partnership Project;Technical Specification Group Services and System Aspects;System Architecture for the 5G System;Stage 2(Release 15);total 176 pages.

Huawei et al.,"Update LADN information to UE",3GPP TSG-CT WG1 Meeting #106 C1-174607,Kochi (India), Oct. 23-27, 2017,total 4 pages.

Qualcomm Incorporated et al ,"TS 23.501: Clarification on mechanisms for LADN support",SA WG2 Meeting #S2-121, S2-173836,May 15-19, 2017, Hangzhou, P. R. China, total 6 pages.

3GPP TS 23.501 V1.5.0 (Nov. 2017),3rd Generation Partnership Project;Technical Specification Group Services and System Aspects;System Architecture for the 5G System;Stage 2(Release 15), total 170 pages.

3GPP TS 23.502 V1.3.0 (Nov. 2017),3rd Generation Partnership Project;Technical Specification Group Services andSystem Aspects;Procedures for the 5G System;Stage 2(Release 15), total 215 pages.

3GPP TS 23.503 V0.4.0 (Nov. 2017),3rd Generation Partnership Project;Technical Specification Group Services andSystem Aspects;Policy and Charging Control Framework forthe 5G System;Stage 2(Release 15), total 53 pages.

HTC,, Update to the LADN procedure [online], 3GPP TSG SA WG2 #123 S2-178156, Internet, Oct. 27, 2017,total 3 pages.

Samsung, Qualcomm Incorporated, TS 23.502—Update 4.3.2 PDU Session establishment for LADN [online], 3GPP TSG SA WG2 #120 S2-171942,, Mar. 31, 2017,total 7 pages.

Huawei, HiSilicon, Ericsson, Update LADN information to UE [online], 3GPP TSG CT WG1 #106 C1-174607,Oct. 27, 2017,total 5 pages.

Huawei, HiSilicon, Update LADN information to UE. 3GPP TSG-CT WG1 Meeting #106, Kochi (India), Oct. 23-27, 2017, C1-174504, 4 pages.

* cited by examiner

COMMUNICATION METHOD AND APPARATUS FOR NETWORK ACCESSIBLE ONLY IN SPECIFIC AREA

CROSS-REFERENCE TO RELATED APPLICATIONS

This application is a continuation of International Application No. PCT/CN2018/111627, filed on Oct. 24, 2018, which claims priority to Chinese Patent Application No. 201810015632.3, filed on Jan. 8, 2018, which claims priority to Chinese Patent Application No. 201711240792.X, filed on Nov. 30, 2017. The disclosures of the aforementioned applications are hereby incorporated by reference in their entireties.

TECHNICAL FIELD

This application relates to the field of mobile communications technologies, and in particular, to a communication method and an apparatus.

BACKGROUND

The 5th generation (5G) communications propose a local area data network (LADN). The LADN is mainly a network deployed for scenarios such as an enterprise, a stadium activity, and a concert hall. A feature of such an LADN is that a terminal can access the LADN only when the terminal is within a service area (SA) of the LADN. When the terminal leaves the service area of LADN, the network disconnects a session accessing the LADN.

After a new local area data network is deployed in an area, there is no solution yet to notify a terminal in the network to update configuration information.

SUMMARY

This application provides a communication method and an apparatus, so as to update configuration information of a terminal.

According to a first aspect, this application provides a communication method. The method includes: a mobility management network element determines a terminal list based on a service area and a data network name (DNN) of a network, where the terminal list includes an identifier of a terminal that is in the service area and that has subscribed to the DNN, and the terminal that has subscribed to the DNN may be a terminal that has subscribed to a wildcard DNN, or may be a terminal that has subscribed to a DNN of the network instead of a wildcard DNN. Then, the mobility management network element obtains policy information corresponding to the DNN, and determines network information corresponding to each terminal in the terminal list, where the network information includes the DNN and a communication area of the terminal. Thereafter, the mobility management network element sends the policy information and the network information corresponding to the terminal, to the terminal in the terminal list.

According to the foregoing method, the mobility management network element first determines the terminal list, and then sends configuration information (including the policy information and the network information) to the terminal in the terminal list, so that the terminal performs updating based on the received configuration information, thereby updating configuration of the terminal. In addition, the mobility management network element updates configuration information of only a terminal that is in a service area of a network and that has subscribed to a DNN of the network, so that network overhead can be reduced.

In a possible implementation, the mobility management network element receives a query request from a communications network element, where the query request is used to request the terminal list; and the mobility management network element sends the terminal list to the communications network element.

The mobility management network element may further receive a subscription from the communications network element, so that if a new terminal enters the service area, and the new terminal has subscribed to the DNN of the network, the mobility management network element reports an identifier of the new terminal to the communications network element.

In the foregoing two implementations, the mobility management network element may send the identifier of the terminal that is in the service area and that has subscribed to the DNN of the network to the communications network element. The communications network element may be a data management network element, a policy control network element, a network exposure network element, or the like.

In a possible implementation, the mobility management network element may alternatively perform the communication methods in the foregoing implementations after receiving a notification message from the communications network element, where the notification message includes the terminal list, and the notification message includes updating of configuration information of the terminal in the terminal list. Optionally, the notification message further includes the policy information.

In another possible implementation, the mobility management network element performs the communication method in the first aspect after receiving a notification message from the communications network element, where the notification message includes the DNN of the network and/or the service area of the network, and the notification message includes updating of configuration information of the terminal.

In a possible implementation, the mobility management network element obtains policy information corresponding to the DNN specifically includes: obtaining the policy information preconfigured in the mobility management network element; or obtaining, by the mobility management network element, the policy information from a policy control network element; or obtaining, by the mobility management network element, the policy information from a data management network element.

According to a second aspect, this application provides a communication method. The method includes: a communications network element obtains a terminal list, where the terminal list includes an identifier of a terminal that is in a service area of a network and that has subscribed to a data network name DNN of the network. The communications network element sends a notification message to a mobility management network element, where the notification message includes the terminal list, and the notification message includes updating of configuration information of the terminal in the terminal list. Further, the communications network element may further receive a response message from the mobility management network element, where the response message is used to notify an update result.

According to the foregoing method, the communications network element instructs the mobility management network element to update the configuration information of the terminal in the terminal list, thereby updating configuration of the terminal. In addition, configuration information of only a terminal that is in a service area of a network and that has subscribed to a DNN of the network is updated, so that network overheads can be reduced.

Optionally, the notification message further includes policy information.

In a possible implementation, the communications network element sends a query request to the mobility management network element, where the query request is used to request the terminal list. The communications network element receives the terminal list from the mobility management network element.

In a possible implementation, the communications network element subscribes to the mobility management network element, so that if a new terminal enters the service area, and the new terminal has subscribed to the DNN, the mobility management network element reports an identifier of the new terminal to the communications network element. Optionally, the communications network element adds the identifier of the new terminal reported by the mobility management network element to the terminal list.

In the foregoing two implementations, the communications network element can obtain the terminal list by using the mobility management network element, where the terminal in the terminal list is a terminal that is in the service area of the network and that has subscribed to the DNN of the network.

According to a third aspect, this application provides a communication method. The method includes: receiving, by a network exposure network element, a request message from an application device, where the request message includes a physical coverage area of a network; determining, by the network exposure network element, a mobility management network element and a service area of the network based on the physical coverage area of the network; and sending, by the network exposure network element, an update message to the mobility management network element, where the update message includes a data network name DNN and the service area of the network.

According to the foregoing method, the network exposure network element deploys a network having a service area, determines a mobility management network element, and further sends an update message to the mobility management network element, so that the mobility management network element stores a DNN and a service area of the network. In this way, when network deployment is completed, configuration of the mobility management network element is updated at the same time.

In a possible implementation, the network exposure network element sends policy information corresponding to the DNN to the mobility management network element; and/or the network exposure network element sends policy information corresponding to the DNN to a data management network element; and/or the network exposure network element sends policy information corresponding to the DNN to a policy control network element.

In a possible implementation, the network exposure network element further adds indication information for the network, where the indication information indicates that the network is a local area data network.

According to a fourth aspect, this application provides a communication method. The method includes: obtaining, by a terminal, policy information, where the policy information includes a local indication and a network identifier used to identify a first network, and the local indication indicates that the first network is a network accessible only in a specific area; and determining, by the terminal based on the policy information, that the first network associated with a detected application is a network accessible only in a specific area.

According to the foregoing method, the terminal can learn whether the first network associated with the application is a network accessible only in a specific area, and perform an operation specific to the network accessible only in the specific area.

In a possible implementation, the method further includes: obtaining, by the terminal, network information; and when the terminal is within an area indicated by the network information, determining, by the terminal, to initiate a session management procedure. For example, the terminal may obtain the network information from a mobility management network element. In another possible implementation, the method further includes: when the terminal has no network information, determining, by the terminal, not to initiate session management. Therefore, when the terminal obtains the network information, the terminal may further determine, based on a location of the terminal and the network information, whether to initiate a session management procedure; or when the terminal does not obtain the network information, it may be considered that the terminal is out of a service area of the network accessible only in the specific area and therefore does not initiate session management.

In the foregoing description, the network information includes the network identifier of the first network and communication area information, and the communication area information indicates an intersection area of a registration area of the terminal and a service area of the first network.

In a possible implementation, when the network accessible only in the specific area is a local area data network LADN, the network identifier is a data network name DNN; or when the network accessible only in the specific area is a local slice network, the network identifier is a slice identifier (for example, an S-NSSAI).

In a possible implementation, the policy information may be a user equipment route selection policy URSP. Alternatively, the policy information may be another policy, for example, a network attribute policy.

According to a fifth aspect, this application provides an apparatus. The apparatus may be a mobility management network element or may be a chip. The apparatus has a function of implementing the foregoing embodiments of the first aspect. The function may be implemented by hardware, or may be implemented by hardware executing corresponding software. The hardware or software includes one or more modules corresponding to the foregoing function.

According to a sixth aspect, an apparatus is provided, including a processor and a memory. The memory is configured to store a computer executable instruction. When the apparatus runs, the processor executes the computer executable instruction stored in the memory, so that the apparatus performs the communication method according to any one of the implementations of the first aspect.

According to a seventh aspect, this application provides an apparatus. The apparatus may be a communications network element or may be a chip. The apparatus has a function of implementing the foregoing embodiments of the second aspect. The function may be implemented by hardware, or may be implemented by hardware executing corresponding software. The hardware or software includes one or more modules corresponding to the foregoing function.

According to an eighth aspect, an apparatus is provided, including a processor and a memory. The memory is configured to store a computer executable instruction. When the apparatus runs, the processor executes the computer executable instruction stored in the memory, so that the apparatus performs the communication method according to any one of the implementations of the second aspect.

According to a ninth aspect, this application provides an apparatus. The apparatus may be a network exposure network element or may be a chip. The apparatus has a function of implementing the foregoing embodiments of the third aspect. The function may be implemented by hardware, or may be implemented by hardware executing corresponding software. The hardware or software includes one or more modules corresponding to the foregoing function.

According to a tenth aspect, an apparatus is provided, including a processor and a memory. The memory is configured to store a computer executable instruction. When the apparatus runs, the processor executes the computer executable instruction stored in the memory, so that the apparatus performs the communication method according to any one of the implementations of the third aspect.

According to an eleventh aspect, this application provides an apparatus. The apparatus may be a terminal or may be a chip. The apparatus has a function of implementing the foregoing embodiments of the fourth aspect. The function may be implemented by hardware, or may be implemented by hardware executing corresponding software. The hardware or software includes one or more modules corresponding to the foregoing function.

According to a twelfth aspect, an apparatus is provided, including a processor and a memory. The memory is configured to store a computer executable instruction. When the apparatus runs, the processor executes the computer executable instruction stored in the memory, so that the apparatus performs the communication method according to any one of the implementations of the fourth aspect.

According to a thirteenth aspect, this application further provides a computer readable storage medium. The computer readable storage medium stores an instruction, and when the instruction is run on a computer, the computer is enabled to perform the methods described in the foregoing aspects.

According to a fourteenth aspect, this application further provides a computer program product including an instruction. When the computer program product is run on a computer, the computer is enabled to perform the methods described in the foregoing aspects.

According to a fifteenth aspect, this application further provides a system. The system includes the mobility management network element and the communications network element in any one of the foregoing method embodiments or apparatus embodiments.

In addition, for technical effects brought by any one of the implementations of the fifth to the fifteenth aspects, refer to the technical effects brought by the different implementations of the first to the third aspects. Details are not described herein again.

These and other aspects of this application will be more readily apparent from the following description of the embodiments.

DESCRIPTION OF EMBODIMENTS

To make the objectives, technical solutions, and advantages of this application clearer, the following further describes this application in detail with reference to the accompanying drawings. A specific operation method in a method embodiment may also be applied to an apparatus embodiment or a system embodiment. In description of this application, unless otherwise noted, "a plurality of" means two or more than two.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art may know that, with the evolution of the network architecture and the emergence of new service scenarios, the technical solutions provided in the embodiments of this application are also applicable to similar technical problems.

Figure 1:
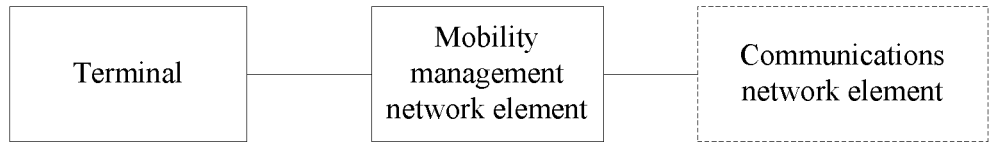
FIG. 1 is a schematic diagram of a possible network architecture according to this application.

FIG. 1 is a schematic diagram of a possible network architecture to which this application is applicable. The network architecture includes a terminal and a mobility management network element. Optionally, the network architecture further includes a communications network element.

The terminal is a device having a wireless transceiver function, which may be deployed on land, including an indoor or outdoor device, a handheld device or a vehicle-mounted device, or may be deployed on water (for example, on a ship), or may be deployed in the air (for example, on an airplane, a balloon, or a satellite). The terminal may be a mobile phone, a tablet computer (pad), a computer having a wireless transceiver function, a virtual reality (VR) terminal, an augmented reality (AR) terminal, a wireless terminal in industrial control, a wireless terminal in a self-driving vehicle, a wireless terminal in telemedicine (remote medical), a wireless terminal in a smart grid, a wireless terminal in transportation safety, a wireless terminal in a smart city, a wireless terminal in a smart home, or the like.

A mobility management network element is mainly responsible for mobility management in a mobile network, for example, user location updating, user network registration, and user handover. For example, the mobility management network element may be an access and mobility management function (AMF) network element in 5G.

A communications network element may be, for example, a data management network element, a policy control network element, or a network exposure network element.

The data management network element is configured to store user data, such as subscription information and authentication/authorization information. For example, the data management network element may be a unified data management (UDM) network element in 5G.

The policy control network element is responsible for providing a policy or the like for the mobility management network element. For example, the policy control network element may be a policy control function (PCF) network element in 5G.

The network exposure network element is responsible for securely providing services and capabilities provided by a mobile network to a third party, for example, to a vertical industry user, edge computing, or an application server. For example, the network exposure network element may be a network exposure function (NEF) network element in 5G.

It may be understood that, the foregoing functions may be network components in a hardware device, or may be software functions running on dedicated hardware or virtualization functions instantiated on a platform (for example, a cloud platform).

For convenience of description, in the subsequent example descriptions of this application, the mobility management network element is the AMF network element, the data management network element is the UDM network element, the policy control network element is the PCF network element, and the network exposure network element is the NEF network element. In addition, for convenience of description, the AMF network element, the UDM network element, the PCF network element, and the NEF network element are briefly referred to as an AMF, a UDM, a PCF, and an NEF, respectively.

Figure 2:
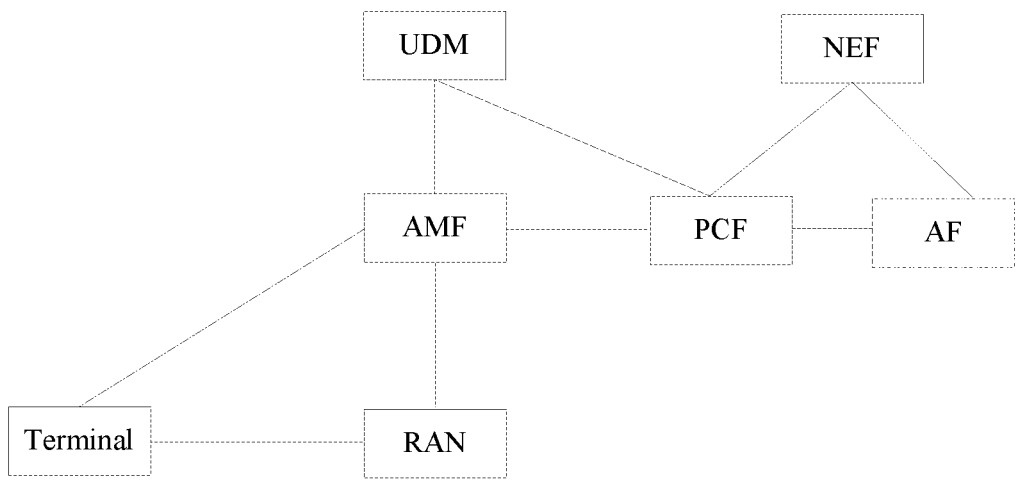
FIG. 2 is a schematic diagram of another possible network architecture according to this application.

FIG. 2 shows a specific system architecture based on the system architecture shown in FIG. 1, including a terminal, a radio access network device, and control plane network elements of a core network. The control plane network elements of the core network include an AMF, a UDM, a PCF, and an NEF. Optionally, the system architecture may further include an application device. In FIG. 2, the application device is an application function (AF) device in 5G, which is used as an example for description.

For functions of the terminal, the AMF, the UDM, the NEF, and the PCF, refer to the foregoing descriptions. Details are not described herein again.

The application device is responsible for providing services for a 3rd generation partnership project (3GPP) network, for example, affecting a service route and interacting with the PCF to perform policy control. The application device is the AF device, which is used as an example below for description in this application.

The RAN device is a device that provides a wireless communication function for the terminal. The RAN device includes a base station, and specifically includes but is not limited to, for example, a next-generation base station (g node B, gNB) in 5G, an evolved NodeB (eNB), a radio network controller (RNC), a NodeB (NB), a base station controller (BSC), a base transceiver station (BTS), a home base station (for example, a home evolved node B or home node B, HNB), a baseband unit (BBU), a transmission/reception point (TRP), a transmission point (TP), or a mobile switching center.

With reference to FIG. 1 and FIG. 2, the following specifically describes a communication method according to this application, to resolve a problem mentioned in the background. It should be noted that this application is not limited to the system architectures shown in FIG. 1 and FIG. 2, and may further be applied to other future communications systems such as a 6G system architecture. In addition, the foregoing network elements used in this application may have different names while keeping same functions in the future communications systems.

In this application, during deployment of a local area data network having a coverage area, a DNN and a service area may be allocated to the local area data network. The DNN is used to identify the local area data network, and the service area is used to represent the coverage area of the local area data network. In addition, the DNN and the service area are further configured on the AMF.

Further, policy information of a terminal may be configured on one or more network elements among the PCF, the UDM, and the AMF. Alternatively, the policy information of the terminal may be configured on the terminal. The policy information of the terminal may be, for example, a correspondence between one or more of an application program (APP), the DNN, a session and service continuity mode (SSC mode), a slice, or a local indication. The local indication indicates whether a network is a local area data network.

In an example, the policy information may be a correspondence between the APP, the DNN, the SSC mode, the slice, and the local indication, or may be a correspondence between the APP, the DNN, and the local indication. For example, the policy information may be a UE route selection policy (URSP).

Alternatively, the local indication (which may also be referred to as indication information of the local area data network) may also be included in DNN information of the policy information. Still alternatively, the local indication may be carried in other policy information different from the URSP. For example, the other policy information may be a network attribute policy. The network attribute policy includes information for indicating whether the network is a network accessible only in a specific area. For example, the network attribute policy includes a correspondence between a network identifier and the local indication.

The local indication may be implemented in different manners. For example, if the local indication is carried, it indicates that the network is the local area data network; or if the local indication is not carried, it indicates that the network is not the local area data network. Alternatively, the local indication having a first value indicates that the network is the local area data network; or the local indication having a second value indicates that the network is not the local area data network. This is not limited in this application herein.

It should be noted that, the foregoing deployment and configuration of the local area data network may be performed by a network management system or by the NEF. The two deployment and configuration methods are specifically described below in this application, and details are not described herein.

It should be further noted that, the local area data network in this application may be an LADN, or may be a local slice network, for example, a slice network deployed by an enterprise. The local slice network allows a user within a coverage area of the local slice network to access the local slice network. For example, the local slice network allows a user within a coverage area of the enterprise to access the local slice network. When the local area data network is the LADN, the network may be identified by the DNN. In other words, the network identifier is the DNN. When the local area data network is the local slice network, the network may be identified by a slice identifier, for example, single network slice selection assistance information (S-NSSAI). In other words, the network identifier is the slice identifier. The following embodiments are described by using the LADN as an example. However, this application may also be applicable to a scenario of the local slice network.

After the foregoing deployment and configuration are performed on the local area data network, configuration of a terminal within the coverage area of the local area data network may be further updated in this application.

Figure 3:
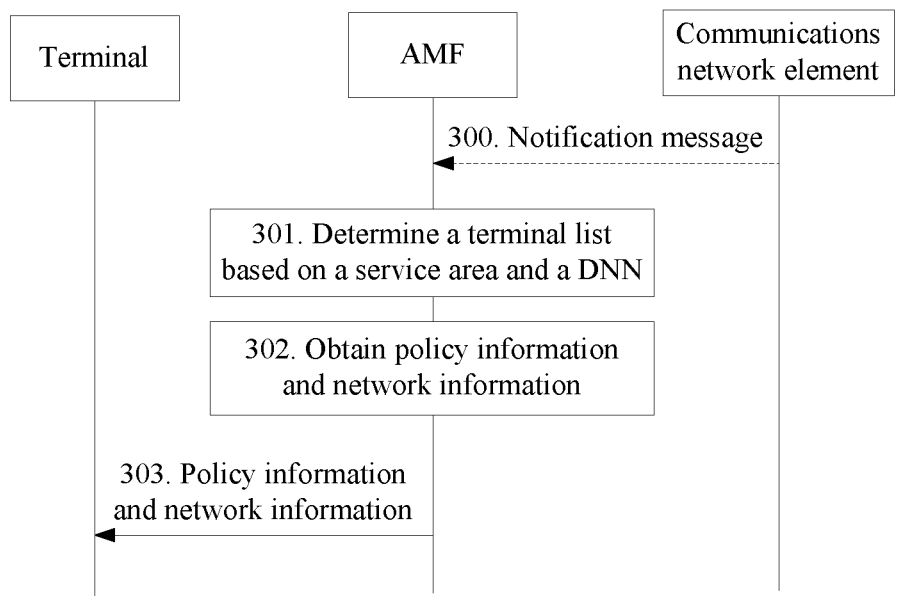
FIG. 3 is a flowchart of a communication method according to this application.

FIG. 3 shows a communication method according to this application. The communication method may be used to update configuration information of a terminal, including the following steps.

Step 300: A communications network element sends a notification message to an AMF, and the AMF receives the notification message from the communications network element.

The notification message includes updating of configuration information of a terminal. Specifically, the notification message informs the AMF to update configuration information of some or all terminals within a coverage area of a network. The configuration information includes policy information of the terminal and/or network information.

It should be noted that step 300 is an optional step. When step 300 is performed, the communications network element triggers the AMF to update the configuration information of the terminal. The communications network element may be a UDM, a PCF, or an NEF. Further, the notification message may further carry a DNN of the network, or carry a service area of the network, or carry a DNN and a service area.

When step 300 is skipped, step 301 is directly performed, that is, the AMF actively triggers updating of the configuration information of the terminal. For example, the AMF may regularly trigger the updating of the configuration information of the terminal. In this case, the communications network element does not need to send the notification message, that is, step 300 does not need to be performed.

Step 301: The AMF determines a terminal list based on a service area and a DNN of a network.

The service area of the network is a service area of a local area data network, for example, a service area of an LADN.

It should be noted that the service area and the DNN have been configured on the AMF during network deployment. Therefore, in step 301, a method for the AMF to obtain the service area and the DNN of the network may be as follows:

When step 300 is performed, if the notification message in step 300 carries the DNN, the AMF may obtain the DNN from the notification message, and then obtain a locally stored service area corresponding to the DNN based on the DNN. In this way, the AMF obtains the DNN and the service area.

When step 300 is performed, if the notification message in step 300 carries the service area, the AMF may obtain the service area from the notification message, and then obtain a locally stored DNN corresponding to the service area based on the service area. In this way, the AMF obtains the DNN and the service area. One or more DNNs may be obtained, and this is not limited in this application.

When step 300 is performed, if the notification message in step 300 carries the DNN and the service area, the AMF may directly obtain the DNN and the service area from the notification message.

When step 300 is skipped, the AMF directly and obtains the DNN and the service area that are locally stored. One or more DNNs may be obtained, and this is not limited in this application.

After obtaining the DNN and the service area by using any one of the foregoing methods, the AMF may determine the terminal list, where the terminal list includes identifiers of one or more terminals. There are a plurality of methods for obtaining the terminal list. In an example, three methods for determining the terminal list are provided below.

Method 1: The AMF determines a terminal that is in the service area of the network and that has subscribed to a wildcard DNN, and uses a list of identifiers of these terminals as the terminal list.

That a terminal has subscribed to a wildcard DNN means that the terminal can access all DNNs, or is understood as that the terminal has subscribed to all DNNs.

For example, the AMF determines that terminals in the service area of the network include a terminal 1, a terminal 2, and a terminal 3, of which the terminal 1 and the terminal 2 have subscribed to a wildcard DNN and the terminal 3 has not subscribed to a wildcard DNN. In this case, the terminal list determined by the AMF is {identifier of the terminal 1, identifier of the terminal 2}.

Method 2: The AMF determines a terminal that is in the service area of the network and that has subscribed to the DNN of the network instead of a wildcard DNN, and uses a list of identifiers of these terminals as the terminal list.

For example, the DNN of the network is denoted as a DNN 0.

The AMF determines that terminals in the service area of the network include a terminal 1, a terminal 2, and a terminal 3, of which the terminal 1 has subscribed to a wildcard DNN, the terminal 2 has subscribed to a DNN 1 and a DNN 2 instead of a wildcard DNN, and the terminal 3 has subscribed to the DNN 0 and the DNN 1 instead of a wildcard DNN. In this case, the terminal list determined by the AMF is {identifier of the terminal 3}.

Method 3: The AMF determines a terminal that is in the service area of the network and that has subscribed to a wildcard DNN and determines a terminal that is in the service area of the network and that has subscribed to the DNN of the network instead of a wildcard DNN, and uses a list of identifiers of the determined terminals as the terminal list.

Method 3 is a method combining the foregoing Method 1 and Method 2.

For example, the DNN of the network is denoted as a DNN 0.

The AMF determines that terminals in the service area of the network include a terminal 1, a terminal 2, and a terminal 3, of which the terminal 1 has subscribed to a wildcard DNN, the terminal 2 has subscribed to a DNN 1 and a DNN 2 instead of a wildcard DNN, and the terminal 3 has subscribed to the DNN 0 and the DNN 1 instead of a wildcard DNN. In this case, the terminal list determined by the AMF is {identifier of the terminal 1, identifier of the terminal 3}.

Regardless of which one of the foregoing methods is used, any terminal included in the terminal list finally determined by the AMF meets the following: The terminal is in the service area, and the terminal has subscribed to the DNN of the network.

Step 302: The AMF obtains policy information corresponding to the DNN, and determines network information corresponding to each terminal in the terminal list.

For example, the policy information may be a URSP.

A manner in which the AMF obtains the policy information may be as follows:

Method 1: The AMF obtains the locally stored policy information.

For example, when the policy information is preconfigured on the AMF, the AMF may obtain the locally stored policy information.

Method 2: The AMF obtains the policy information from the PCF.

For example, when the policy information is configured on the PCF during the network deployment, the AMF may obtain the policy information from the PCF.

For another example, when the policy information is configured on the UDM but not configured on the PCF during the network deployment, if the AMF requests the policy information from the PCF, the PCF may first obtain the policy information from the UDM, and then send the policy information to the AMF.

Method 3: The AMF obtains the policy information from the UDM.

For example, when the policy information is configured on the UDM during the network deployment, the AMF may obtain the policy information from the UDM.

For another example, when the policy information is configured on the PCF but not configured on the UDM during the network deployment, if the AMF requests the policy information from the UDM, the UDM may first obtain the policy information from the PCF, and then send the policy information to the AMF.

A method for determining, by the AMF, the network information corresponding to each terminal in the terminal list includes the following:

For each terminal in the terminal list, a registration area of the terminal is obtained, and an intersection of the registration area of the terminal and the service area of the network is determined as a communication area of the terminal. Then, the DNN of the network and the communication area of the terminal are determined as the network information of the terminal. In other words, the network information of the terminal includes the DNN of the network and the communication area of the terminal. The network information of the terminal may also be referred to as LADN information.

It should be noted that when the registration area of the terminal and the service area of the LADN have no intersection, the communication area of the terminal is null. Correspondingly, the network information (namely, the LADN information) of the terminal is null.

It should be noted that registration areas of terminals in the terminal list may be the same or may be different. When all the terminals in the terminal list have a same registration area, all the terminals in the terminal list have same network information. When not all the terminals in the terminal list have a same registration area, not all the terminals in the terminal list have same network information.

In this application, the policy information and the network information of the terminal may be collectively referred to as the configuration information. In other words, the configuration information of the terminal includes the policy information and the network information.

Step 303: The AMF sends the policy information and the network information corresponding to the terminal, to the terminal in the terminal list.

In step 303, the AMF sends the configuration information (including the policy information and the network information) of each terminal in the determined terminal list to the terminal.

When the network information (namely, the LADN information) of the terminal is null, in step 303, the AMF sends only the policy information to the terminal in the terminal list. Correspondingly, the terminal in the terminal list obtains the policy information from the AMF. Optionally, in another embodiment, the policy information may alternatively be configured on the terminal, and the terminal may obtain the policy information from configured information.

According to step 300 to step 303 or step 301 to step 303, the AMF first determines the terminal list, and then sends the configuration information (including the policy information and the network information) to the terminal in the terminal list, so that the terminal performs updating based on the received configuration information, thereby updating configuration of the terminal. In addition, the AMF only updates configuration information of a terminal that is in a service area of a network and that has subscribed to a DNN of the network, so that network overheads can be reduced.

Figure 4:
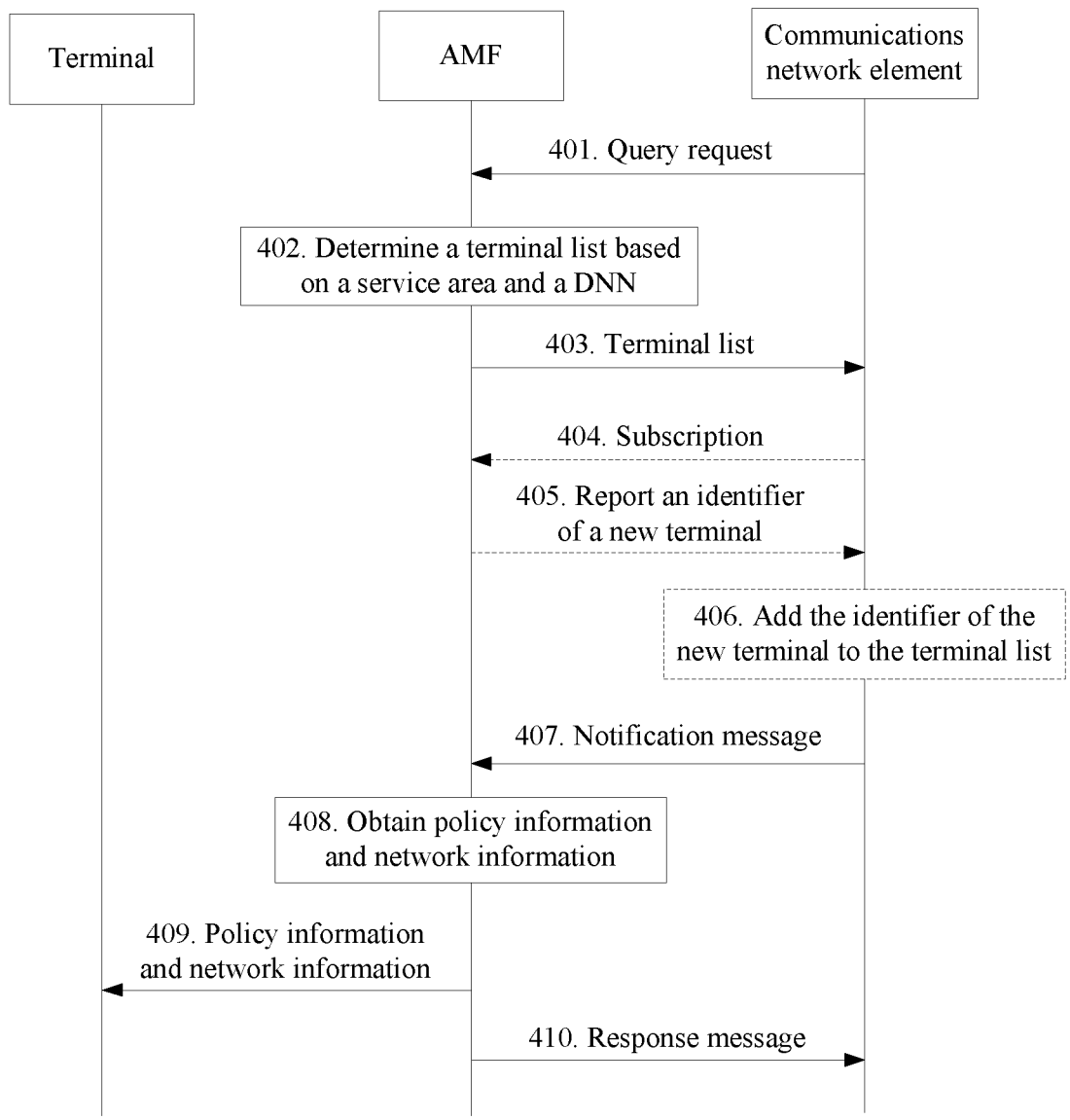
FIG. 4 is a flowchart of another communication method according to this application.

FIG. 4 shows another communication method according to this application. The communication method may be used to update configuration information of a terminal, including the following steps.

Step 401: A communications network element sends a query request to an AMF, and the AMF receives the query request from the communications network element.

The communications network element may be a UDM, a PCF, or an NEF. The query request is used to request a terminal list.

Optionally, the query request includes a DNN and/or a service area.

Step 402: The AMF determines the terminal list based on the service area and the DNN.

After receiving the query request, the AMF determines the service area and the DNN.

The service area and the DNN have been configured on the AMF during network deployment. Therefore, a method for the AMF to obtain a service area and a DNN of a network may be as follows:

If the query request carries the DNN, the AMF may obtain the DNN from the query request, and then based on the DNN, obtain a locally stored service area corresponding to the DNN. In this way, the AMF obtains the DNN and the service area.

If the query request carries the service area, the AMF may obtain the service area from the query request, and then based on the service area, obtain a locally stored DNN corresponding to the service area. In this way, the AMF obtains the DNN and the service area. One or more DNNs may be obtained, and this is not limited in this application.

If the query request carries the DNN and the service area, the AMF may directly obtain the DNN and the service area from the query request.

Further, after determining the DNN and the service area, the AMF determines the terminal list. A specific method is the same as the foregoing method for determining a terminal list in step 301, and reference may be made to the foregoing description.

Step 403: The AMF sends the terminal list to the communications network element.

Step 404: The communications network element subscribes to the AMF, so that if a new terminal enters the service area, and the new terminal has subscribed to the DNN of the network, the AMF reports an identifier of the new terminal to the communications network element.

A method for the AMF to determine an identifier of a new terminal that meets the reporting condition is: if a terminal is in the service area and has subscribed to the DNN of the network, and the terminal is previously out of the service area, the AMF determines that the terminal is the new terminal that meets the reporting condition.

Step 405: The AMF reports the identifier of the new terminal to the communications network element.

In an implementation, the AMF may regularly report identifiers of one or more terminals that meet the reporting condition. For example, in step 404, the communications network element may carry a timer when subscribing to the AMF, where the timer is used to notify the AMF of a time interval of regular reporting. For another example, a timer may also be preconfigured on the AMF. This is not limited in this application.

In another implementation, the AMF may alternatively report an identifier of a new terminal to the communications network element immediately when determining that the new terminal meets the reporting condition.

In addition, it should be noted that, if identifiers of a plurality of terminals are to be reported at a time, the identifiers of the terminals may be added to a terminal list and then reported to the communications network element.

Step 406: The communications network element adds the identifier of the new terminal to the terminal list.

It should be noted that in an implementation, step 404 to step 406 are optional steps. In other words, step 404 to step 406 may alternatively be skipped.

In another implementation, step 404 and step 401 may also be combined into one step, that is, when sending the query request in step 401, the communications network element further subscribes to the AMF.

For example, when step 404 to step 406 are performed, the following provides a specific example for description, to help understand this solution. It is assumed that according to step 401 to step 403, the communications network element receives a terminal list, which is specifically {identifier of a terminal 1, identifier of a terminal 2, identifier of a terminal 3}. Then, the AMF further reports an identifier of a terminal 4. In this case, the AMF adds the identifier of the terminal 4 to the terminal list, and an updated terminal list is {identifier of the terminal 1, identifier of the terminal 2, identifier of the terminal 3, identifier of the terminal 4}.

According to step 401 to step 403, or step 401 to step 406, the communications network element may obtain the terminal list.

Certainly, the foregoing is merely one implementation method for the communications network element to obtain the terminal list. In actual application, the communications network element may obtain the terminal list by using another method. This is not limited in this application.

Then, step 407 is performed.

Step 407: The communications network element sends a notification message to the AMF, and the AMF receives the notification message from the communications network element.

The notification message includes updating of configuration information of the terminal in the terminal list.

The terminal list included in the notification message is the terminal list determined by using step 401 to step 403, or the terminal list determined by using step 401 to step 406.

The notification message includes the terminal list. Optionally, the notification message further includes the DNN and/or the service area. Optionally, the notification message further includes policy information.

Step 408: The AMF obtains the policy information and network information.

Upon receiving the notification message, the AMF determines that the configuration information of the terminal needs to be updated. Therefore, the AMF needs to determine the configuration information of the terminal in the terminal list.

If the notification message includes the policy information, the AMF obtains the policy information from the notification message. If the notification message does not include the policy information, the AMF may obtain the policy information according to any one of the three methods described in step 302.

Further, for a method for the AMF to obtain the network information of the terminal in the terminal list, refer to the method described in step 302. Details are not described herein again.

Step 409: The AMF sends the policy information and the network information to the terminal in the terminal list.

For step 409, refer to the foregoing method described in step 303. Details are not described herein again.

Step 410: The AMF sends a response message to the communications network element, and the communications network element receives the response message from the AMF.

The response message notifies an update result. For example, the update result is update succeeded, update failed, or the like.

It should be noted that step 410 is an optional step. In addition, step 410 may occur at any step after step 407.

According to step 401 to step 403 and step 407 to step 410, or step 401 to 410, the communications network element first obtains the terminal list by using the AMF, then adds the terminal list to the notification message and sends the notification message to the AMF, to notify the AMF to update configuration of the terminal in the terminal list, thereby updating the configuration of the terminal. In addition, the AMF only updates configuration information of a terminal that is in a service area of a network and that has subscribed to a DNN of the network, so that network overheads can be reduced.

At this point, according to the method in FIG. 3 or FIG. 4, the terminal within the coverage area of the network obtains the network information and the policy information. When the terminal starts an APP (the APP can access a newly deployed network, for example, is a live sports APP developed by an organizer of a stadium), information such as a DNN, a slice, or an SSC mode corresponding to the APP may be determined based on the policy information, and then it is determined based on a local indication that a network, that the APP accesses, is a network accessible only in a specific area. Then, the terminal determines, based on the network information and a location of the terminal, whether the terminal is within the coverage area of the network. When the terminal is within the coverage area of the network, the terminal may initiate a session establishment procedure or reuse an existing session, to perform service transmission.

In other words, when the terminal detects an APP (for example, when a user starts an APP on the terminal), the terminal needs to determine a network identifier (for example, a DNN or an S-NSSAI) associated with the APP, to transmit a service packet corresponding to the APP. For example, after obtaining the policy information, the terminal learns, based on the local indication in the policy information, whether a network that the APP accesses is a network accessible only in a specific area.

As described above, when the registration area of the terminal and the service area of the LADN have no intersection, the network information of the terminal is null. Therefore, there may be no network information on the terminal.

When there is no network information on the terminal, the terminal considers that the terminal is out of the service area of the LADN, and therefore does not initiate session management. In other words, when there is no network information on the terminal, the terminal does not initiate session management.

When the terminal learns, based on the local indication in the policy information, that a network that the APP accesses is a network accessible only in a specific area, and there is network information on the terminal, the terminal determines, based on the network information and the location of the terminal, whether the terminal is within the service area of the LADN. If the terminal is within the service area of the LADN, the terminal initiates session management; or if the terminal is out of the service area of the LADN, the terminal does not initiate session management.

The session management procedure may be a session establishment procedure or a process of implementing service transmission through session reuse. The service transmission process means that the terminal transmits a service packet of the APP on an existing session. When the reused session is in an inactive state, the session management procedure further includes a session activation procedure.

Figure 11:
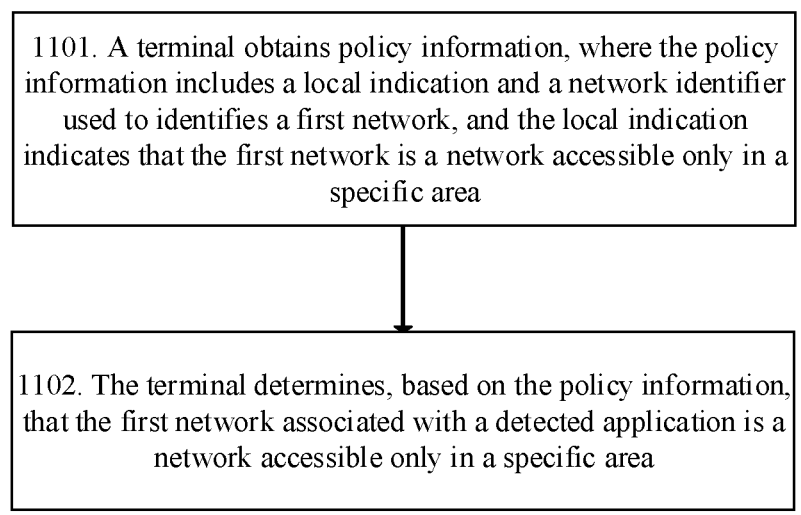
FIG. 11 is a flowchart of a communication method according to this application.

Therefore, this application further discloses a communication method, as shown in FIG. 11. The method includes the following steps:

Step 1101: A terminal obtains policy information, where the policy information includes a local indication and a network identifier used to identify a first network, and the local indication indicates that the first network is a network accessible only in a specific area.

Step 1102: The terminal determines, based on the policy information, that the first network associated with a detected application is a network accessible only in a specific area.

According to the foregoing method, the terminal can learn whether the first network associated with the application is a network accessible only in a specific area, and perform an operation specific to the network accessible only in the specific area.

In a possible implementation, the method further includes: obtaining, by the terminal, network information; and when the terminal is within an area indicated by the network information, determining, by the terminal, to initiate a session management procedure. For example, the terminal may obtain the network information from a mobility management network element. In another possible implementation, the method further includes: when the terminal has no network information, determining, by the terminal, not to initiate session management. Therefore, when the terminal obtains the network information, the terminal may further determine, based on a location of the terminal and the network information, whether to initiate a session management procedure; or when the terminal does not obtain the network information, it may be considered that the terminal is out of a service area of the network accessible only in the specific area and therefore does not initiate session management.

In the foregoing description, the network information includes the network identifier of the first network and communication area information, and the communication area information indicates an intersection area of a registration area of the terminal and a service area of the first network.

In a possible implementation, when the network accessible only in the specific area is an LADN, the network identifier is a DNN; or when the network accessible only in the specific area is a local slice network, the network identifier is a slice identifier (for example, an S-NSSAI).

In a possible implementation, the policy information may be a URSP. Alternatively, the policy information may be another policy, for example, a network attribute policy.

Further, when the terminal leaves a coverage area of the network, the stored network information and policy information may be processed in the following manners:

Processing manner 1: When the terminal determines that the terminal is out of the service area, the terminal deletes the network information and the policy information.

Processing manner 2: When the terminal determines that the terminal is out of the service area, the terminal starts a timer. When the timer expires, the terminal deletes the network information and the policy information. The timer may be configured by the terminal itself, or may be sent to the terminal by using step 303 or step 409.

In conclusion, according to the method shown in FIG. 3 or FIG. 4, configuration information of a terminal within a coverage area of a newly deployed network can be updated.

The following further describes a deployment method for a new network provided in this application. The deployment method is performed before the method embodiments shown in FIG. 3 and FIG. 4.

Figure 5:
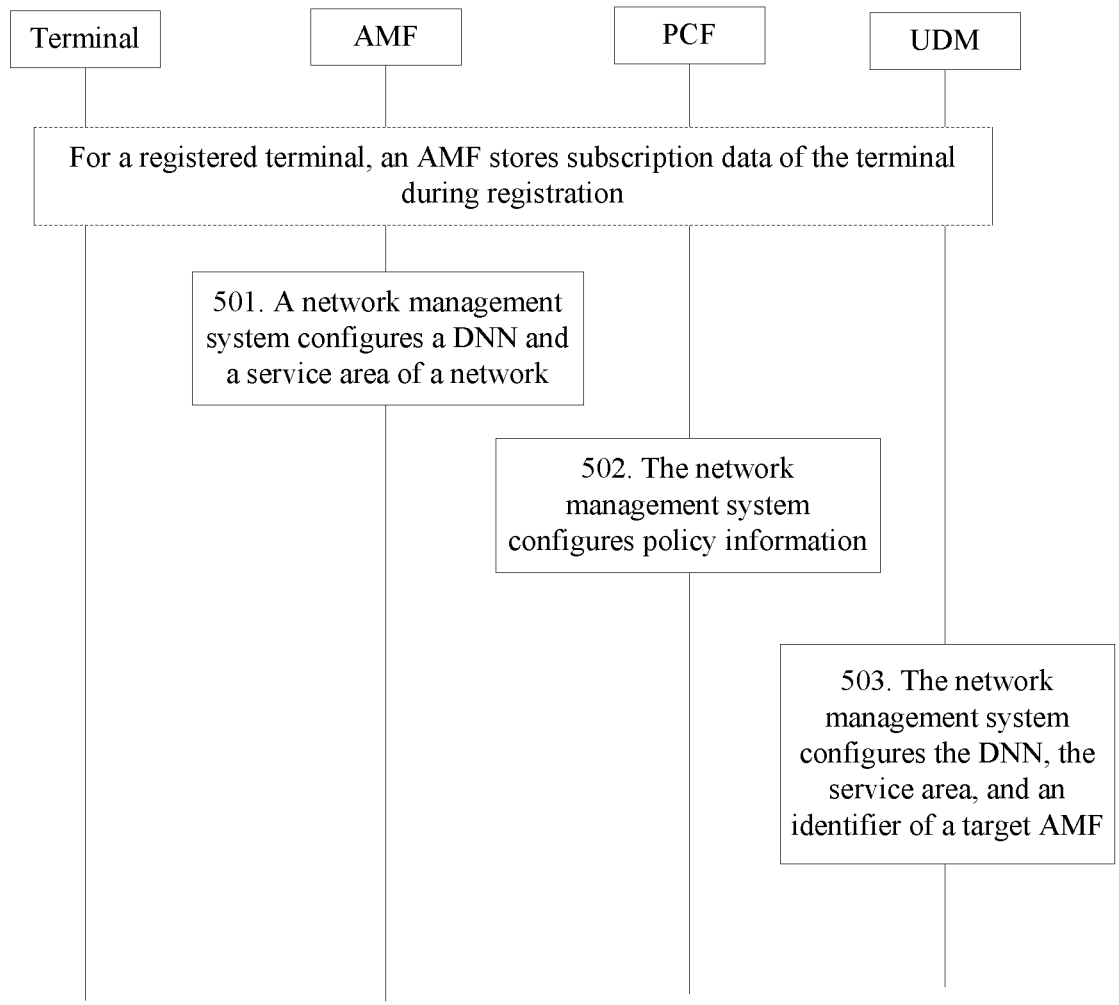
FIG. 5 is a flowchart of a network deployment method according to this application.

FIG. 5 shows a communication method according to this application, which may also be referred to as a network deployment method, including the following steps.

Step 501: A network management system configures a DNN and a service area of a network on an AMF.

The AMF herein is an AMF within a coverage area of the network.

Step 502: The network management system configures policy information on a PCF.

Optionally, the network management system may alternatively configure the policy information on a UDM.

Optionally, the network management system may alternatively configure the policy information on the PCF and the UDM.

Step 503: The network management system configures the DNN, the service area, and identification information of a target AMF on the UDM.

An identifier of the target AMF is identification information of the AMF within the coverage area of the network. The identification information may be, for example, address information.

It should be noted that, before step 501, that is, before deployment of the new network, if terminals that have registered with a 3GPP network exist, the AMF stores subscription data of the terminals during registration of the terminals. For example, the subscription data includes a DNN to which the terminal subscribes. The subscribed DNN may be a wildcard DNN, or some specific DNNs may be subscribed.

According to step 501 to step 503, the network management system deploys the new network, and specifically, performs configuration on each of the AMF, the PCF, and the UDM.

It should be noted that there is no definite execution order for step 501 to step 503, and the execution order is not limited in this application.

Figure 6:
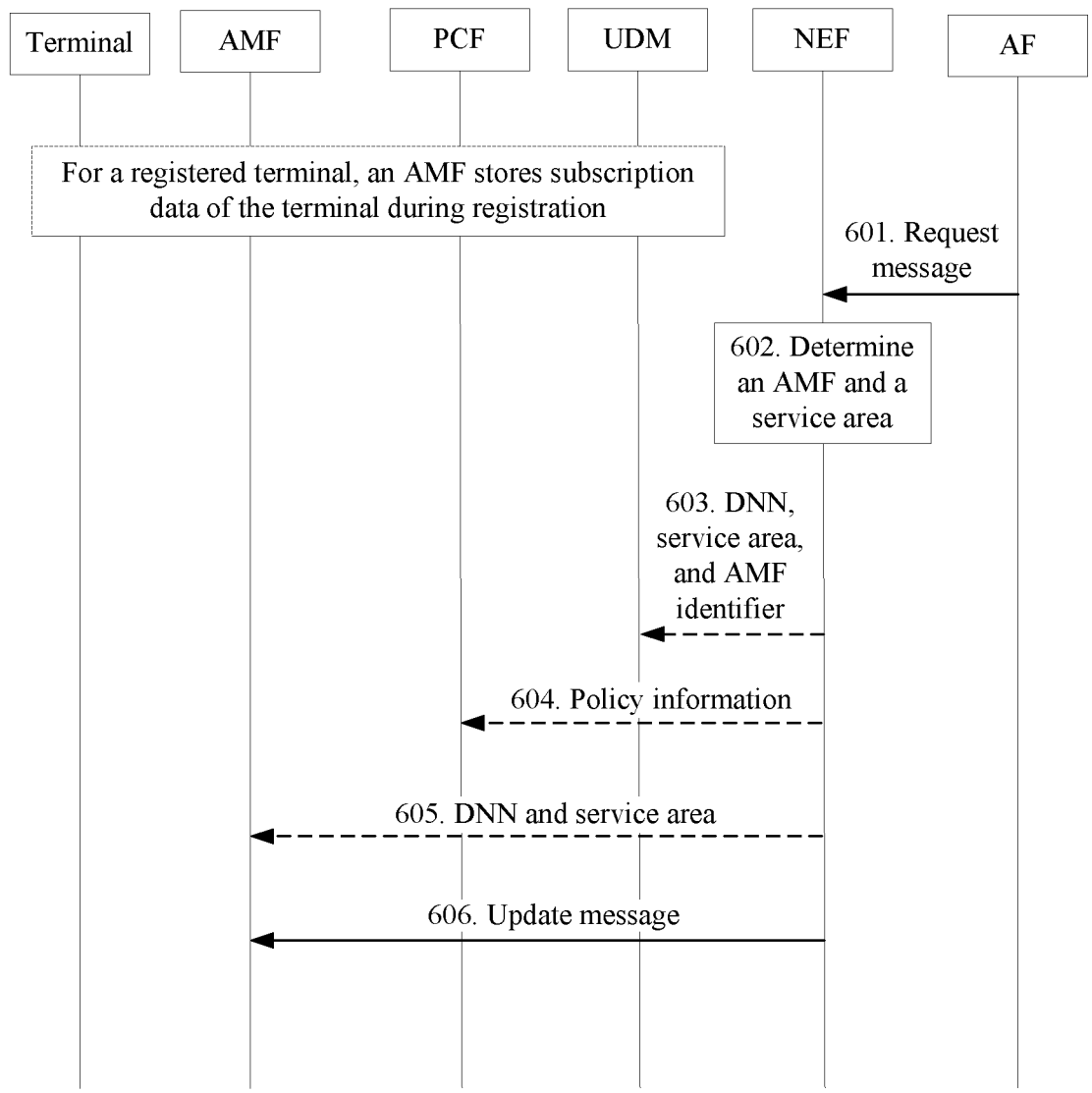
FIG. 6 is a flowchart of another network deployment method according to this application.

FIG. 6 shows another communication method according to this application, which may also be referred to as a network deployment method, including the following steps.

Step 601: An NEF receives a request message from an application device, where the request message includes a physical coverage area of a network.

In an example, the physical coverage area of the network may be a physical coverage area such as a stadium or a concert hall.

Optionally, the request message further includes a data network access identifier and a network requirement. The data network access identifier (DNAI) is an identifier of a user plane accessing one or more DNs during deployment of an application program. The network requirement includes quality of service (QoS), an APP list, or the like.

Step 602: The NEF determines an AMF and a service area of a network based on the physical coverage area of the network.

The NEF maps the physical coverage area of the network into an area that can be identified by a core network, for example, into a service area. Further, a DNN may further be generated for the network.

The NEF determines the AMF based on the physical coverage area of the network. The determined AMF is an AMF within the service area.

Further, if the request message includes the data network access identifier and the network requirement, it may further be determined, based on the physical coverage area of the network, the data network access identifier, and the network requirement, whether there is an appropriate network element (such as a user plane function (UPF) network element, an AMF, or a session management function (SMF) network element) in the network, to serve the network. If there is no appropriate network element in the network, the NEF interacts with management and orchestration (MANO), so that the MANO deploys a network element instance at a corresponding location.

Further, in an example, configuration may be performed on each network element by using step 603 to step 605 described below, and there is no definite execution order for step 603, step 604, and step 605.

Step 603: The NEF sends the DNN, the service area, and an identifier of the AMF to a UDM.

Optionally, the NEF further sends policy information to the UDM.

Step 604: The NEF sends the policy information to a PCF.

Step 605: The NEF sends the DNN and the service area to the AMF.

Optionally, the NEF further sends policy information to the AMF.

According to step 603 to step 605, configuration is performed on each network element, so that the NEF performs configuration on the network. In an implementation, alternatively, the NEF may add indication information for the network, where the indication information indicates that the network is a local area data network. For example, the added indication information is a local indication, used to indicate that the network is a local area data network.

Further, after the foregoing network configuration is completed, step 606 may further be performed.

Step 606: The NEF sends an update message to the AMF, where the update message includes the data network name DNN and the service area of the network.

Step 606 is used to trigger the AMF to update configuration information of a terminal. Step 606 may be step 300 in the embodiment shown in FIG. 3.

It should be noted that, before step 601, that is, before deployment of the new network, if terminals that have registered with a 3GPP network exist, the AMF stores subscription data of the terminals during registration of the terminals. For example, the subscription data includes a DNN to which the terminal subscribes. The subscribed DNN may be a wildcard DNN, or some specific DNNs may be subscribed.

After the network deployment is completed by using the network deployment method shown in FIG. 5 or FIG. 6, configuration of a terminal may be further updated by using the method in FIG. 3 or FIG. 4.

Figure 7:
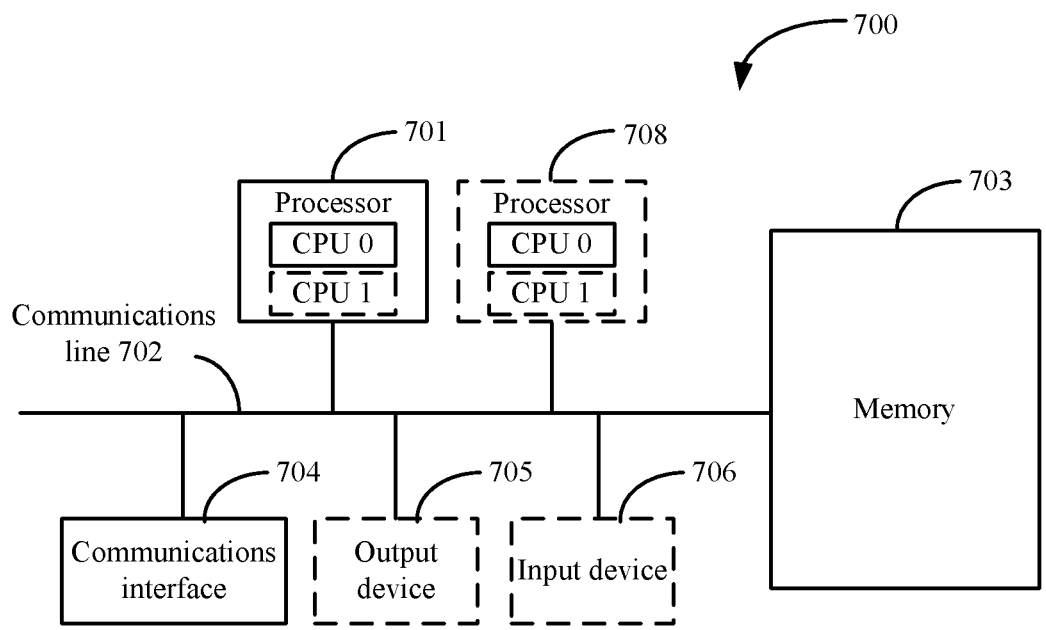
FIG. 7 is a schematic diagram of an apparatus according to this application.

Based on a same inventive concept, FIG. 7 is a schematic diagram of an apparatus according to this application. The apparatus may be a mobility management network element, a communications network element, a terminal, or a chip, and may perform the method in any one of the foregoing embodiments. The communications network element may be a data management network element, a policy control network element, or a network exposure network element.

The apparatus 700 includes at least one processor 701, a communications line 702, a memory 703, and at least one communications interface 704.

The processor 701 may be a general-purpose central processing unit (CPU), a microprocessor, an application-specific integrated circuit (ASIC), or one or more integrated circuits configured to control program execution of solutions of this application.

The communications line 702 may include a path, to transfer information between the foregoing components.

The communications interface 704 uses any apparatus such as a transceiver to communicate with another device or communications network, such as Ethernet, a radio access network (RAN), or a wireless local area network (WLAN).

The memory 703 may be a read-only memory (ROM) or another type of static storage device capable of storing static information and an instruction, or a random access memory (RAM) or another type of dynamic storage device capable of storing information and an instruction; or may be an electrically erasable programmable read-only memory (EEPROM), a compact disc read-only memory (CD-ROM) or another compact disc storage, optical disc storage (including a compact disc, a laser disc, an optical disc, a digital versatile disc, a Blu-ray disc, and the like), or magnetic disk storage medium or another magnetic storage device, or any other medium that can carry or store expected program code having an instruction or data structure form and can be accessed by using a computer, but is not limited thereto. The memory may exist independently, and is connected to the processor by using the communications line 702. Alternatively, the memory may be integrated with the processor.

The memory 703 is configured to store a computer executable instruction for executing the solutions of this application, and the processor 701 controls the execution. The processor 701 is configured to execute the computer executable instruction stored in the memory 703, to implement the communication method provided in the following embodiment of this application.

Optionally, the computer executable instruction in this embodiment of this application may also be referred to as application program code. This is not specifically limited in this embodiment of this application.

During specific implementation, in an embodiment, the processor 701 may include one or more CPUs, for example, a CPU 0 and a CPU 1 in FIG. 7.

During specific implementation, in an embodiment, the apparatus 700 may include a plurality of processors, for example, the processor 701 and a processor 708 in FIG. 7. Each of the processors may be a single-core (single-CPU) processor, or may be a multi-core (multi-CPU) processor. The processor herein may be one or more devices, circuits, and/or processing cores for processing data (for example, a computer program instruction).

During specific implementation, in an embodiment, the apparatus 700 may further include an output device 705 and an input device 706. The output device 705 communicates with the processor 701, and may display information in a plurality of manners. For example, the output device 705 may be a liquid crystal display (LCD), a light emitting diode (LED) display device, a cathode ray tube (CRT) display device, a projector, or the like. The input device 706 communicates with the processor 701, and may receive an input from a user in a plurality of manners. For example, the input device 706 may be a mouse, a keyboard, a touchscreen device, a sensing device, or the like.

The apparatus 700 may be a general-purpose device or may be a dedicated device. During specific implementation, the apparatus 700 may be a desktop computer, a portable computer, a network server, a personal digital assistant (PDA), a mobile phone, a tablet computer, a wireless terminal device, an embedded device, or a device having a structure similar to FIG. 7. A type of the apparatus 700 is not limited in this embodiment of this application.

When the apparatus shown in FIG. 7 is a chip, for example, may be a chip of a mobility management network element, a chip of a network exposure network element, a chip of a policy control network element, or a chip of a data management network element, the chip includes the processor 701 (and may further include the processor 708), the communications line 702, the memory 703, and the communications interface 704. Specifically, the communications interface 704 may be an input interface, a pin, a circuit, or the like. The memory 703 may be a register, a cache, or the like. The processor 701 and the processor 708 may be general-purpose CPUs, microprocessors, ASICs, or one or more integrated circuits configured to control program execution of the communication method in any one of the foregoing embodiments.

Figure 8:
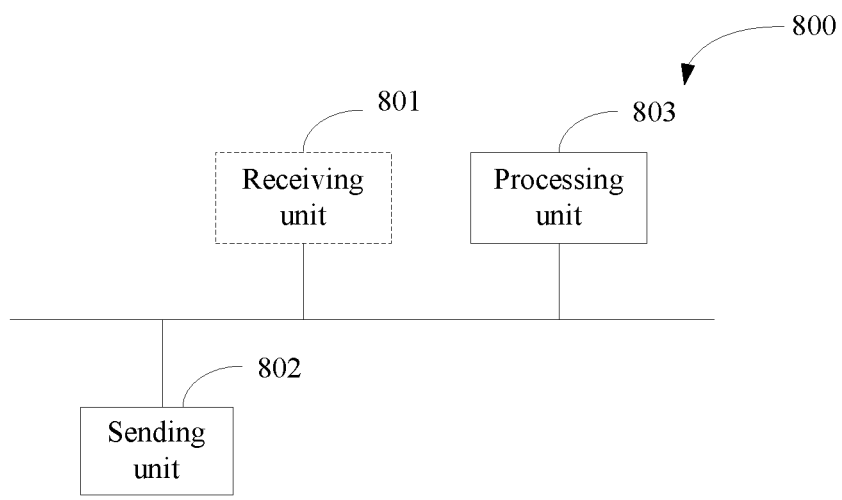
FIG. 8 is a schematic diagram of another apparatus according to this application.

Division of function modules of the apparatus may be performed based on the foregoing method examples in this application. For example, the function modules may be divided based on corresponding functions, or two or more functions may be integrated into a processing module. The integrated module may be implemented in a form of hardware, or may be implemented in a form of a software function module. It should be noted that, in this application, module division is an example, and is merely logical function division. In actual implementation, another division manner may be used. For example, when the function modules are divided based on the corresponding functions, FIG. 8 is a schematic diagram of an apparatus 800. The apparatus 800 may be the mobility management network element in the foregoing embodiments. The apparatus 800 includes a sending unit 802 and a processing unit 803. Optionally, the apparatus 800 further includes a receiving unit 801.

The processing unit 803 is configured to determine a terminal list based on a service area and a data network name DNN of a network, where the terminal list includes an identifier of a terminal that is in the service area and that has subscribed to the DNN; and configured to obtain policy information corresponding to the DNN and determine network information corresponding to each terminal in the terminal list, where the network information includes the DNN and a communication area of the terminal.

The sending unit 802 is configured to send the policy information and the network information corresponding to the terminal, to the terminal in the terminal list.

In an implementation, the receiving unit 801 is configured to receive a query request from a communications network element, where the query request is used to request the terminal list. The sending unit 802 is further configured to send the terminal list to the communications network element.

In an implementation, the receiving unit 801 is further configured to receive a subscription from the communications network element, so that if a new terminal enters the service area, and the new terminal has subscribed to the DNN, the mobility management network element reports an identifier of the new terminal to the communications network element.

In an implementation, the receiving unit 801 is further configured to receive a notification message from the communications network element, where the notification message includes the terminal list, and the notification message includes updating of configuration information of the terminal in the terminal list. Optionally, the notification message further includes the policy information.

In an implementation, the receiving unit 801 is configured to receive a notification message from the communications network element, where the notification message includes the DNN and/or the service area, and the notification message includes updating of configuration information of the terminal.

In an implementation, the processing unit 803 is specifically configured to: obtain the policy information preconfigured on the apparatus; or obtain the policy information from a policy control network element; or obtain the policy information from a data management network element.

It should be understood that the apparatus may be configured to implement the steps performed by the mobility management network element in the method in the embodiment of the present invention. For related features, refer to the foregoing descriptions. Details are not described herein again.

Specifically, the functions/implementation processes of the receiving unit 801, the processing unit 803, and the sending unit 802 in FIG. 8 may be implemented by the processor 701 in FIG. 7 by invoking the computer executable instruction stored in the memory 703. Alternatively, the function/implementation process of the processing unit 803 in FIG. 8 may be implemented by the processor 701 in FIG. 7 by invoking the computer executable instruction stored in the memory 703, and the functions/implementation processes of the receiving unit 801 and the sending unit 802 in FIG. 8 may be implemented by the communications interface 704 in FIG. 7.

Optionally, when the apparatus 800 is a chip, the functions/implementation processes of the receiving unit 801 and the sending unit 802 may alternatively be implemented by a pin, a circuit, or the like. Optionally, when the apparatus 800 is a chip, the memory 703 may be a storage unit in the chip, for example, a register or a cache. Certainly, when the apparatus 800 is a mobility management network element, the memory 703 may be a storage unit outside a chip in the mobility management network element. This is not specifically limited in this embodiment of this application.

Figure 9:
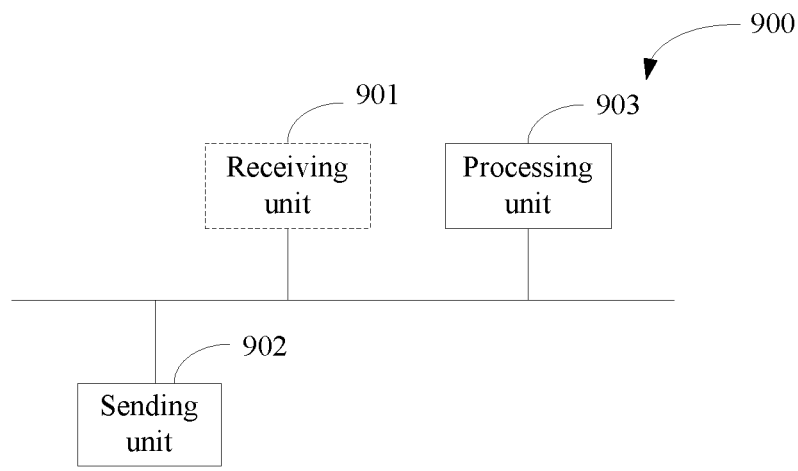
FIG. 9 is a schematic diagram of another apparatus according to this application.

Division of function modules of the apparatus may be performed based on the foregoing method examples in this application. For example, the function modules may be divided based on corresponding functions, or two or more functions may be integrated into a processing module. The integrated module may be implemented in a form of hardware, or may be implemented in a form of a software function module. It should be noted that, in this application, module division is an example, and is merely logical function division. In actual implementation, another division manner may be used. For example, when the function modules are divided based on the corresponding functions, FIG. 9 is a schematic diagram of an apparatus 900. The apparatus 900 may be the communications network element in the foregoing embodiments. The apparatus 900 includes a processing unit 903 and a sending unit 902. Optionally, the apparatus 900 further includes a receiving unit 901.

The processing unit 903 is configured to obtain a terminal list, where the terminal list includes an identifier of a terminal that is in a service area of a network and that has subscribed to a data network name DNN of the network.

The sending unit 902 is configured to send a notification message to a mobility management network element, where the notification message includes the terminal list, and the notification message includes updating of configuration information of the terminal in the terminal list. Optionally, the receiving unit 901 is configured to receive a response message from the mobility management network element, where the response message is used to notify an update result. Optionally, the notification message further includes policy information.

In an implementation, the processing unit 903 is configured to send a query request to the mobility management network element by using the sending unit 902, where the query request is used to request the terminal list. The receiving unit 901 is configured to receive the terminal list from the mobility management network element.

In an implementation, the sending unit 902 is further configured to subscribe to the mobility management network element, so that if a new terminal enters the service area, and the new terminal has subscribed to the DNN, the mobility management network element reports an identifier of the new terminal to the communications network element.

In an implementation, the processing unit 903 is specifically configured to add the identifier of the new terminal reported by the mobility management network element to the terminal list.

It should be understood that the apparatus may be configured to implement the steps performed by the communications network element in the method in the embodiment of the present invention. For related features, refer to the foregoing descriptions. Details are not described herein again. The communications network element may be a data management network element, a policy control network element, or a network exposure network element.

Specifically, the functions/implementation processes of the receiving unit 901, the sending unit 902, and the processing unit 903 in FIG. 9 may be implemented by the processor 701 in FIG. 7 by invoking the computer executable instruction stored in the memory 703. Alternatively, the function/implementation process of the processing unit 903 in FIG. 9 may be implemented by the processor 701 in FIG. 7 by invoking the computer executable instruction stored in the memory 703, and the functions/implementation processes of the receiving unit 901 and the sending unit 902 in FIG. 9 may be implemented by the communications interface 704 in FIG. 7.

Optionally, when the apparatus 900 is a chip, the functions/implementation processes of the receiving unit 901 and the sending unit 902 may alternatively be implemented by a pin, a circuit, or the like. Optionally, when the apparatus 900 is a chip, the memory 703 may be a storage unit in the chip, for example, a register or a cache. Certainly, when the apparatus 900 is a communications network element, the memory 703 may be a storage unit outside a chip in the communications network element. This is not specifically limited in this embodiment of this application.

Figure 10:
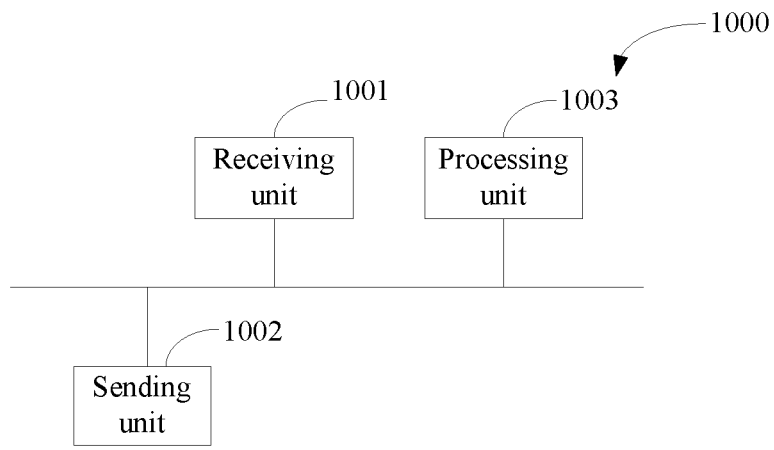
FIG. 10 is a schematic diagram of another apparatus according to this application.

Division of function modules of the apparatus may be performed based on the foregoing method examples in this application. For example, the function modules may be divided based on corresponding functions, or two or more functions may be integrated into a processing module. The integrated module may be implemented in a form of hardware, or may be implemented in a form of a software function module. It should be noted that, in this application, module division is an example, and is merely logical function division. In actual implementation, another division manner may be used. For example, when the function modules are divided based on the corresponding functions, FIG. 10 is a schematic diagram of an apparatus 1000. The apparatus 1000 may be the network exposure network element in the foregoing embodiments. The apparatus 1000 includes a receiving unit 1001, a sending unit 1002, and a processing unit 1003.

The receiving unit 1001 is configured to receive a request message from an application device, where the request message includes a physical coverage area of a network.

The processing unit 1003 is configured to determine a mobility management network element and a service area of the network based on the physical coverage area of the network.

The sending unit 1002 is configured to send an update message to the mobility management network element, where the update message includes a data network name DNN and the service area of the network.

In an implementation, the sending unit 1002 is further configured to: send policy information corresponding to the DNN to the mobility management network element; and/or send policy information corresponding to the DNN to a data management network element; and/or send policy information corresponding to the DNN to a policy control network element.

In an implementation, the processing unit 1003 is further configured to add indication information for the network, where the indication information indicates that the network is a local area data network.

It should be understood that the apparatus may be configured to implement the steps performed by the network exposure network element in the method in the embodiment of the present invention. For related features, refer to the foregoing descriptions. Details are not described herein again.

Specifically, the functions/implementation processes of the receiving unit 1001, the sending unit 1002, and the processing unit 1003 in FIG. 10 may be implemented by the processor 701 in FIG. 7 by invoking the computer executable instruction stored in the memory 703. Alternatively, the function/implementation process of the processing unit 1003 in FIG. 10 may be implemented by the processor 701 in FIG. 7 by invoking the computer executable instruction stored in the memory 703, and the functions/implementation processes of the receiving unit 1001 and the sending unit 1002 in FIG. 10 may be implemented by the communications interface 704 in FIG. 7.

Optionally, when the apparatus 1000 is a chip, the functions/implementation processes of the receiving unit 1001 and the sending unit 1002 may alternatively be implemented by a pin, a circuit, or the like. Optionally, when the apparatus 1000 is a chip, the memory 703 may be a storage unit in the chip, for example, a register or a cache. Certainly, when the apparatus 1000 is a network exposure network element, the memory 703 may be a storage unit outside a chip in the network exposure network element. This is not specifically limited in this embodiment of this application.

Figure 12:
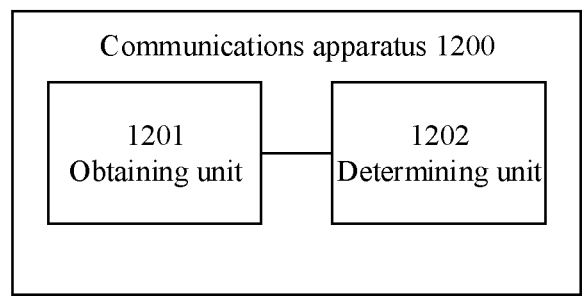
FIG. 12 is a schematic diagram of a communications apparatus according to this application.

FIG. 12 is a schematic diagram of a communications apparatus 1200. The communications apparatus 1200 may be the terminal in the foregoing embodiments. The communications apparatus 1200 includes an obtaining unit 1201 and a processing unit 1202.

The obtaining unit 1201 is configured to obtain policy information, where the policy information includes a local indication and a network identifier used to identify a first network, and the local indication indicates that the first network is a network accessible only in a specific area.

The determining unit 1202 is configured to determine, based on the policy information, that the first network associated with a detected application is a network accessible only in a specific area.

According to the communications apparatus, the terminal can learn whether the first network associated with the application is a network accessible only in a specific area, and perform an operation specific to the network accessible only in the specific area.

In an implementation, the obtaining unit 1201 is further configured to obtain network information. For example, the obtaining unit 1201 may obtain the network information from a mobility management network element. The determining unit 1202 is further configured to: when the terminal is within an area indicated by the network information, determine, by the terminal, to initiate a session management procedure. In another implementation, the determining unit 1202 is further configured to: when the terminal has no network information, determine, by the terminal, not to initiate session management. Therefore, when the terminal obtains the network information, the terminal may further determine, based on a location of the terminal and the network information, whether to initiate a session management procedure; or when the terminal does not obtain the network information, it may be considered that the terminal is out of a service area of the network accessible only in the specific area and therefore does not initiate session management.

It should be understood that the apparatus may be configured to implement the steps performed by the terminal in the method in the embodiment of the present invention. For related features, refer to the foregoing descriptions. Details are not described herein again.

Specifically, the functions/implementation processes of the obtaining unit 1201 and the processing unit 1202 in FIG. 12 may be implemented by the processor 701 in FIG. 7 by invoking the computer executable instruction stored in the memory 703. Alternatively, the function/implementation process of the processing unit 1202 in FIG. 12 may be implemented by the processor 701 in FIG. 7 by invoking the computer executable instruction stored in the memory 703, and the function/implementation process of the obtaining unit 1201 in FIG. 12 may be implemented by the communications interface 704 in FIG. 7.

Optionally, when the apparatus 1200 is a chip, the function/implementation process of the obtaining unit 1201 may alternatively be implemented by a pin, a circuit, or the like. Optionally, when the apparatus 1200 is a chip, the memory 703 may be a storage unit in the chip, for example, a register or a cache. Certainly, when the apparatus 1200 is a terminal, the memory 703 may be a storage unit outside a chip in the terminal. This is not specifically limited in this embodiment of this application.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The various illustrative logical units and circuits described in the embodiments of this application may implement or operate the described functions by using a general-purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Alternatively, the storage medium may further be integrated into a processor. The processor and the storage medium may be disposed in an ASIC, and the ASIC may be disposed in a terminal device. Alternatively, the processor and the storage medium may also be disposed in different components of the terminal device.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although the present invention is described with reference to specific features and the embodiments thereof, various modifications and combinations may be made to them without departing from the spirit and scope of the present invention. Correspondingly, the specification and accompanying drawings are merely example description of the present invention defined by the appended claims, and are considered as any of or all modifications, variations, combinations or equivalents that cover the scope of the present invention. A person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A communication method, comprising:
   determining, by a terminal, that an application is associated with a network;
   determining, by the terminal based on information configured on the terminal that the network is accessible only in a service area of the network;
   determining whether the terminal includes network information comprising a network identifier for the network and communication area information, and:
      when the terminal determines that it does not have the network information, determining, by the terminal, to forego initiation of a session management procedure;
      when the terminal determines that it has the network information and the terminal is within an area indicated by the network information, determining, by the terminal, to initiate a session management procedure;
      when the terminal determines that it has the network information and the terminal is outside of the area indicated by the network information, determining, by the terminal, to forego initiation of a session management procedure.

2. The method according to claim 1, further comprising: obtaining the network information from a mobility management network element.

3. The method according to claim 1, further comprising: after the terminal determines that it has the network information and is within the service area indicated by the network information, deleting, by the terminal, the network information for the network when the terminal determines that it is no longer in the area indicated by the network information.

4. The method according to claim 1, wherein the communication area information indicates an intersection area of a registration area of the terminal and the service area of the network.

5. The method according to claim 1, wherein the network is a local area data network and the network identifier is a data network name.

6. The method according to claim 1, wherein the network is a local slice network and the network identifier is a slice identifier.

7. The method according to claim 1, wherein the session management procedure comprises a session establishment procedure or a process of implementing service transmission of the application through an existing session.

8. A communication apparatus, comprising:
   an interface;
   at least one processor; and
   a non-transitory computer-readable storage medium coupled to the at least one processor and storing a program to be executed by the at least one processor, the program including instructions that cause the communication apparatus to:
      determine that an application is associated with a network;
      determine, based on information configured on the apparatus, that the network is a network accessible only in a service area of the network;
      determine whether the communication apparatus includes network information comprising a network identifier for the network and communication area information, and:
      when the apparatus determines that it does not have the network information, forego initiation of a session management procedure;
      when the apparatus determines that it has the network information and that the apparatus is within an area indicated by the network information, determine to initiate a session management procedure;
      when the apparatus determines that it has the network information and the apparatus is outside of the area indicated by the network information, forego initiation of a session management procedure.

9. The apparatus according to claim 8, wherein the program includes instructions that, when executed by the at least one processor, cause the apparatus to:
   obtain the network information from a mobility management network element.

10. The apparatus according to claim 8, wherein the program includes instructions that, when executed by the at least one processor, cause the apparatus to:
    delete the network information for the first network after the apparatus leaves the area indicated by the network information.

11. The apparatus according to claim 8, wherein the communication area information indicates an intersection area of a registration area of the apparatus and the service area of the network.

12. The apparatus according to claim 8, wherein the network is a local area data network and the network identifier is a data network name.

13. The apparatus according to claim 8, wherein the session management procedure comprises a session establishment procedure or a process of implementing service transmission of the detected application through an existing session.

14. A non-transitory computer-readable medium storing computer instructions for execution by one or more processors, wherein the computer instructions instruct the one or more processors to perform operations of:
   determining that an application is associated with a network;
   determining, based on information configured on a terminal, that the network is a network accessible only in a service area of the network;
   determining whether the terminal includes network information comprising a network identifier for the network and communication area information, and:
      when the terminal determines that it does not have the network information, foregoing initiation of a session management procedure;

when the terminal determines that it has the network information and that the terminal is within an area indicated by the network information, initiating a session management procedure; and when the terminal determines that it has the network information and that the terminal is outside of the area indicated by the network information, foregoing initiation of a session management procedure.

15. The non-transitory computer-readable medium according to claim 14, wherein the computer instructions instruct the one or more processors to obtain the network information from a mobility management network element.

16. The non-transitory computer-readable medium according to claim 14, wherein the computer instructions further instruct the one or more processors to perform operations of:

deleting the network information for the network after the terminal leaves the area indicated by the network information.

17. The non-transitory computer-readable medium according to claim 14, wherein the communication area information indicates an intersection area of a registration area of the terminal and the service area of the network.

18. The non-transitory computer-readable medium according to claim 17, wherein the computer instructions further instruct the one or more processors to:

forego initiation of a session management procedure when the terminal does not have network information for the network.

* * * * *